Patented June 13, 1939

2,162,657

UNITED STATES PATENT OFFICE 2,162,657

METHOD OF PRODUCING COMMERCIAL ALKALI PHOSPHATES

Andreas Wehrstein, Vienna, Austria, assignor to the firm Persil Gesellschaft Henkel & Voith m. b. H., Vienna, Austria, a company of Austria No Drawing. Application August 16, 1937, Serial No. 159,439. In Austria September 21, 1936

1 Claim. (Cl. 23—107)

This invention relates to the production of alkali phosphates of the degree of purity usual in the commercial product. Generally speaking, commercial alkali phosphates are at present produced from phosphoric acid by neutralization with alkali carbonate to yield the diphosphate which may then be converted into the triphosphate, for example by further treatment with caustic soda solution. If it is possible to use pure phosphoric acid as starting material alkali phosphates of commercial purity are directly obtained by neutralization without purification.

However, crude phosphoric acid generally contains varying quantities of impurities, more particularly calcium, aluminium, and iron. To obtain commercially pure alkali phosphates from crude phosphoric acid it is thus necessary either to purify the crude phosphoric acid before use or to purify the final products by crystallization. As a rule such crystallization is carried out twice so as to obtain products conforming to the usual commercial standards as regards purity.

It is also known to produce alkali phosphates from dilute crude phosphoric acid that has been subjected to no purification of any kind, and which therefore still contains all its original impurities, by neutralizing the crude phosphoric acid with alkali carbonates to yield the mono- and diphosphate, and removing the precipitated out impurities by filtering. From the resulting dilute solution there must then be obtained a commercial product by crystallization, if necessary or desirable after preliminary evaporation, to concentrate the solution.

From concentrated crude phosphoric acid containing some 28% to 60% of $P_2O_5$ it is not possible, however, to obtain alkali phosphates by this method, since filtering at this degree of concentration is not feasible, with the result that the alkali phosphates obtained contain more impurities than is consistent with commercial requirements in the matter of purity. Attempts have also been made to produce alkali phosphate of commercial purity from crude phosphoric acid containing 28%–60% of $P_2O_5$ by first converting the crude phosphoric acid with alkali carbonates into the monophosphate without the addition of water. The greater part of the impurities is thereby caused to precipitate out, and can be removed by filtration. If to the concentrated monophosphate thus obtained there be then once more added alkali carbonate but only in such an amount that somewhat less than half the monophosphate is converted into the diphosphate a further portion of the impurities is caused to precipitate out.

I have now found that, by the addition of hydrogen sulphide or other sulphides, for instance sodium sulphide, at this stage of neutralization, although the solution is not yet alkaline, the remaining impurities, of which it is mainly the iron that is troublesome, can be precipitated out in the form of sulphides, and removed. The sulphide precipitate is, it is true, highly colloidal and passes readily through the filter. But the sulphides can be satisfactorily filtered out provided the impurity precipitates formed in the course of the neutralization of the monophosphate almost to the extent of one-half with the formation of the diphosphate are still present. The concentrated filtrate is then sufficiently pure to yield the alkali salts in commercial purity after further neutralization.

The main advantage of this new method resides in the fact that it becomes possible in this manner to produce pure alkali phosphates poor in water directly from crude highly concentrated phosphoric acid, with consequent considerable saving in time and expense.

Examples (1) 100 kgs. of commercial crude phosphoric acid containing 45.5% of $P_2O_5$, and, by way of impurities, 1.1% of Fe, 1.2% of $Al_2O_3$, and 0.9% of CaO, is reacted with 45 kgs. of $H_2O$ and 35 kgs. of ammoniacal soda. After the carbon dioxide has escaped the suspension is filtered and the precipitate washed twice with water using 10 kgs. of water each time. The dry filtered residue obtained weighs 11 kgs., and the filtrate contains 130 kgs. of monophosphate. The initial reaction is carried out at a temperature of about 90° C. The filtrate is then reacted with 11 kgs. of ammoniacal soda at a temperature of approximately 90° C., and, after the evolved carbon dioxide has escaped and the reaction mixture allowed to cool off, 0.7 kg. of sodium sulphide is added. The impurities are removed by filtration and washed once with 10 kgs. of water. The dry residue of filtration weighs 1 kg. The filtrate contains 109 kgs. of sodium phosphate of which 36.5% is in the form of $NaH_2PO_4$ and 29.54% in the form of $Na_2HPO_4$, that is to say 36% of $P_2O_5$ in all. The impurities still present amount to only 0.167%, the proportion of iron present being only 0.007%. By the further addition of 18 kgs. of ammoniacal soda to the filtrate the whole of the monophosphate is converted into diphosphate and a pure white product obtained.

(2) 172 kgs. of curacao phosphate containing 35.35% of $P_2O_5$ is decomposed in the heat with 228 kgs. of sulphuric acid of 60° Bé. and 130 kgs. of water. By filtration there is obtained 180 kgs. of crude phosphoric acid containing 30.36% of $P_2O_5$. 150 kgs. of this crude phosphoric acid is reacted with 35 kgs. of ammoniacal soda without any further addition of water. The further procedure is the same as in Example 1, the same quantities of soda and sulphide being employed as are specified in the said example.

I claim:

In the production of commercially pure alkali metal phosphate from crude phosphoric acid, by neutralization, in stages, with alkali metal carbonate, without preliminary purification, and with separating out of the impurities in a stage of neutralization approximately half-way between monophosphate and diphosphate, at a concentration of 28%–60% $P_2O_5$, the steps which consist in precipitating out the impurities, and particularly iron, by the addition of alkali metal sulphide in an amount less than about 1% based on the weight of the crude $H_3PO_4$ and filtering out the resulting precipitate in the presence of the precipitate formed in the course of the said neutralization up to half-way between monophosphate and diphosphate.

ANDREAS WEHRSTEIN.